(No Model.) 3 Sheets—Sheet 2.
G. LHOTE.
PLANING AND RESAWING MACHINE.
No. 569,288. Patented Oct. 13, 1896.
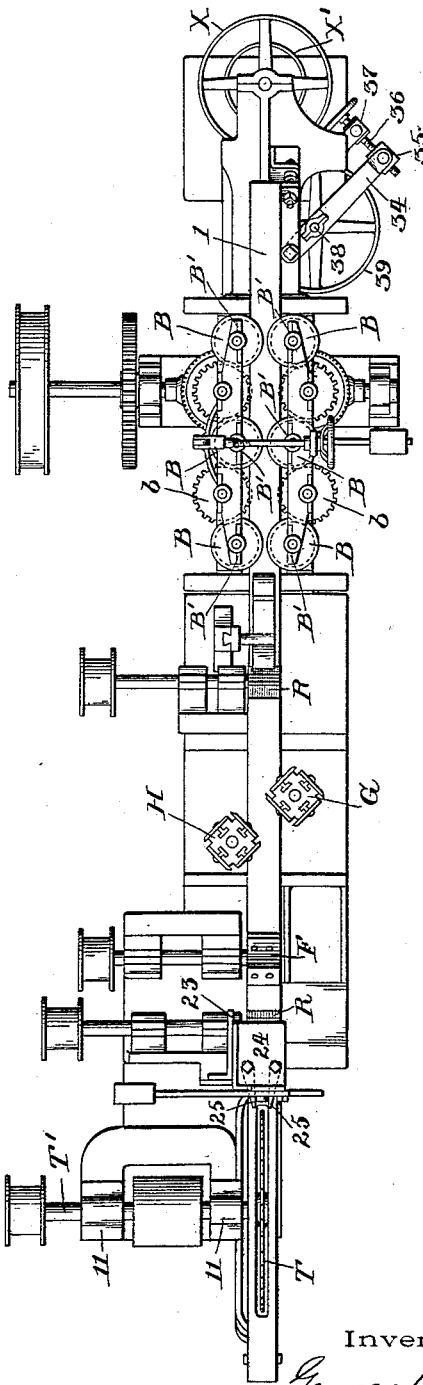
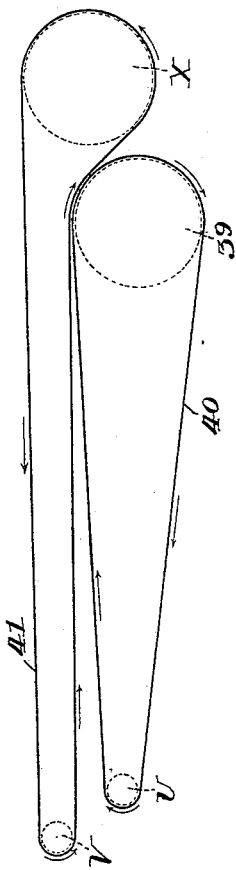
Witnesses.
J. W. Shannon
Philip Bouteljé
Inventor.
George Lhote
By J. V. Hunter
Attorney.

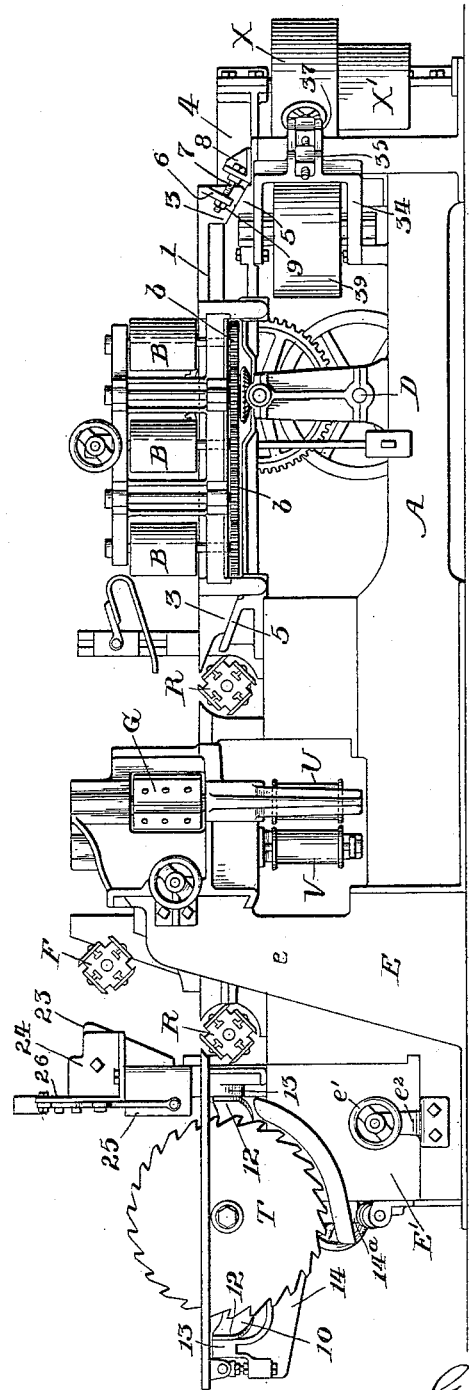

(No Model.) 3 Sheets—Sheet 3.

G. LHOTE.
PLANING AND RESAWING MACHINE.

No. 569,288. Patented Oct. 13, 1896.

Witnesses.
J. W. Shannon
Philip Boutelje

Inventor.
George Lhote
By _____
Attorney.

UNITED STATES PATENT OFFICE.

GEORGE LHOTE, OF NEW ORLEANS, LOUISIANA.

PLANING AND RESAWING MACHINE.

SPECIFICATION forming part of Letters Patent No. 569,288, dated October 13, 1896.

Application filed August 27, 1895. Serial No. 560,653. (No model.)

*To all whom it may concern:*

Be it known that I, GEORGE LHOTE, a citizen of the United States, residing in the city of New Orleans, in the State of Louisiana, have invented certain new and useful Improvements in Planing and Resawing Machines, of which the following is a full, clear, and exact description, reference being had to the accompanying drawings, forming a part of this specification.

My invention relates to planing and resawing machines, and comprises improvements upon the planing or weather-board machine described in and patented to me by Letters Patent No. 328,794, dated October 20, 1885, in which is described a machine adapted to plane two sides and both edges of the board and split the same by sawing at one operation, and having also the additional function of tonguing and grooving the two edges of the board at a single operation by slight changes in the arrangement of the parts of the device.

My present improvements have for their object to make the jointing-table adjustable, so as to bring the material to be sawed to an exact width and perfectly true; also, to enable the board to be sawed at a predetermined incline or angle by providing adjusting devices to tilt the saw; also, to self-center the rough material that is not needed to be dressed by means of self centering and adjusting devices, and, finally, the tightening and loosening at pleasure of the belts for the side heads by the provision of adjusting devices for the belts for that purpose.

Figure 3:
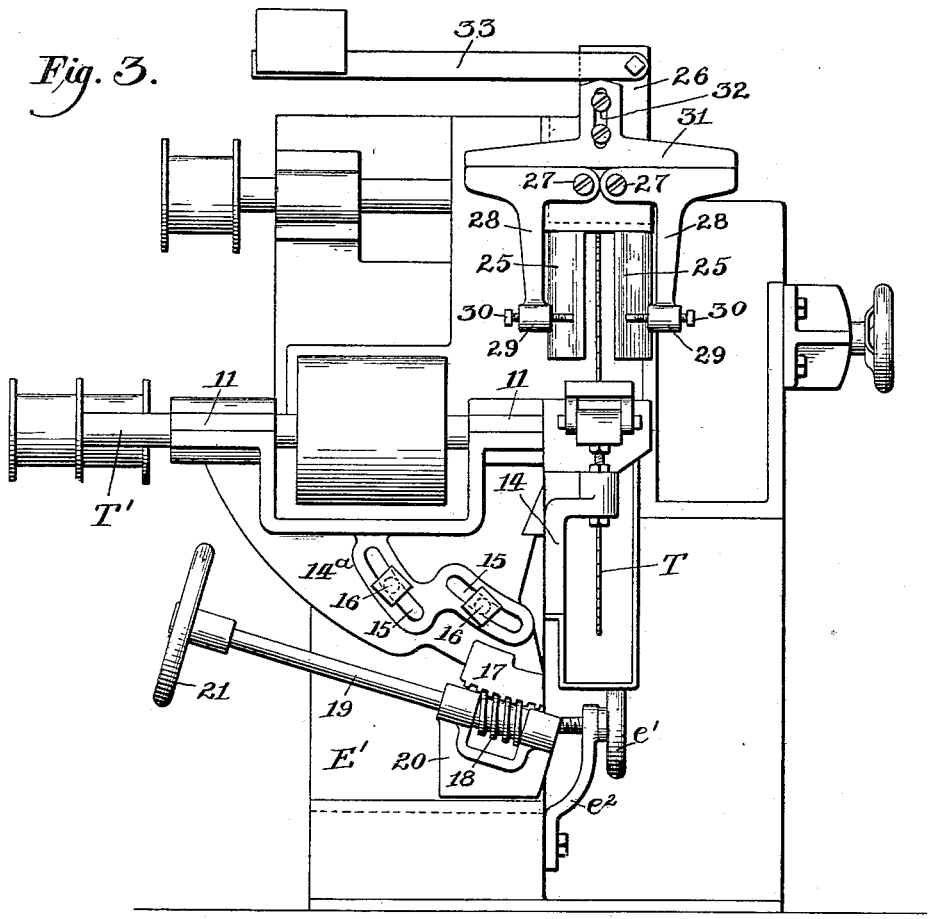
Figure 4:
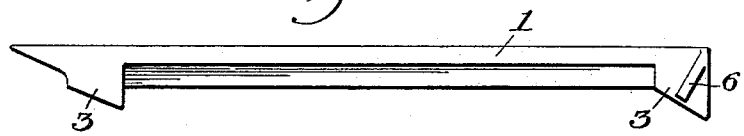
Figure 5:
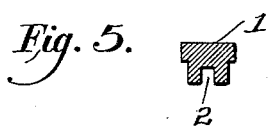

In the accompanying drawings, illustrating my invention, Figure 1 is a side elevation of my improved planing-machine. Fig. 2 is a plan thereof, the upper extension of the frame E being removed. Fig. 2$^a$ is a diagram of the belts for actuating the side heads. Fig. 3 is an elevation of the delivery end of the machine. Fig. 4 is a view of the jointing-table detached, and Fig. 5 is a transverse section thereof.

As stated in my previous patent, to which reference may be had, the machine is constructed in such manner that the board while being planed shall pass forward to the delivery end on its edge to prevent injury to the planed sides from chips getting between the same and the platens, and as set forth in that patent the various parts of the machine are readily accessible, owing to the construction and arrangement of the several parts, of which there are retained in my present improved machine the following elements of the previous device, namely: first, a single centrally-located frame forming a support for the feed-rolls and their pulleys, the feed-rolls being supported on bearings on either side of the frame and arranged on vertical axes; second, cutter-heads on vertical axes, one on either side of the middle line of the supporting-frame, the heads being mounted in supports adapted and arranged to move transversely of the main frame; third, two cutter-heads on vertical axes on either side of the machine, one arranged to make surface cut, the opposite to make parallel cut, one head being in advance of the other, and both provided with platens and having means of adjustment; fourth, a top head and bottom head with two side heads on vertical axes arranged relatively, as hereinafter described, whereby the board, while standing on its edge, may be planed on two edges, or in the alternative may be tongue-and-grooved and planed on both sides at one operation; and, lastly, the arrangement with a top head and a bottom head and two side heads of a saw whereby the board may be planed on both its edges as well as on both its sides and in addition thereto be sawed centrally in two parts at one operation.

Without describing in detail all the parts of the present machine which are set forth and described in my said prior patent and referring thereto for a more specific description of the construction and operation of such parts of my present device as are described therein, it will be seen by reference to the present drawings that A represents a single middle frame consisting of a casting which forms the bed of the forward end of the machine and the support for the feed-rolls B B B, of which there are six in number, three of them arranged on each side of the frame on vertical axes.

The shafts of the feed-rolls are mounted in boxes B' B', suitably disposed on the outer sides of the frame A, said shafts being connected with a gear-train $b$, that is geared with and actuated by the main driving-shaft D.

Another frame, E, with side supports e, is constructed as before and is similarly arranged at the end of the frame A. The frame E affords support for the cutter-heads F, G, H, and R and for the supporting and operating mechanism of the saw T, hereinafter described.

One part of my present invention consists in the provision of a vertically-adjustable support or table, termed a "jointing-table," which is arranged at the forward end of the machine and is adapted to insure the accurate feeding of the material to the cutters, to the end that the material shall be planed to an exact width preparatory to its passage to the saw. The table comprises a bar 1, longitudinally channeled on its under side, as at 2, and provided with downwardly-projecting end supports 3, which are beveled or inclined on their under faces, as seen. The bar is fitted to a longitudinal central rib 4 on the frame A, the beveled supports being imposed upon correspondingly-beveled surfaces 5, formed on or affixed to said frame, whereby if said bar be advanced or be retracted the coacting bevel-surfaces will insure the minute vertical adjustment of the bar upward or downward in a horizontal plane, as desired. The bar is provided at or near its forward end with a laterally-projecting perforated lug 6, to which is fitted an inclined set-screw 7, mounted in a suitably-disposed bracket 8 on the frame A, whereby the proper turning of the screw will effect the described adjustment of the bar. The screw is or may be provided with a jam-nut 9, that takes against the opposed face of the lug.

Another part of my invention consists in the provision of an adjustable saw-supporting frame, with adjusting means therefor, whereby the saw may be tilted in respect to the vertically-disposed plank so as to saw the material at any desired angle.

The numeral 10 designates the saw-bearing frame, comprising a casting with bearings 11 for the support of the power-driven shaft T', on which the usual saw T is mounted, and with pivotal trunnions 12 for the support of said frame in bearings 13 on a rearward extension 14 of a supplemental frame E', whereby the frame 10, in conjunction with the saw and its adjuncts, may be swung or tilted laterally in its pivotal bearings. Frame 10 is provided with a depending portion $14^a$, having curved slots 15, through which project from the supplemental frame supporting bolts or pins 16. On this portion $14^a$ is fixed a segmental rack 17, which is engaged by a worm 18 on a shaft 19, borne in a suitably-disposed bracket 20. The worm-shaft is provided with a hand-wheel 21, whereby the shaft may be actuated to effect the requisite angular adjustments of the saw-supporting frame through the operation of the worm upon the rack.

Inasmuch as the trunnion-bearings 12 of the frame 10 are in the vertical plane of the saw and the axial or center line of the movement of the said frame passes through the saw, the latter can be tilted or inclined in both directions with respect to the line of feed. The saw-table, being narrow, does not interfere with the upward inclination of the saw-arbor when the saw is tilted or inclined to the right (looking at the saw from the front as in Fig. 3) with respect to the feed-line. Moreover, this angular adjustment of the saw is accompanied with less vertical movement or rise and also with less lateral movement with respect to the table.

The supplemental frame E' is fitted to guides in the end of the frame E, so as to be transversely adjustable, the adjustment being effected by means of a hand-screw $e'$, fitted to bearings in a suitably-disposed bracket $e^2$. It will be seen that by properly turning the screw the frame E' may be bodily adjusted, so as to set the saw in respect to the median or feed line of the machine.

Another part of my invention consists in the provision of a mechanism whereby the material, irrespective of its thickness, shall be centrally adjusted with relation to the saw, the same being designed for use with rough or undressed material more especially. This mechanism is of the following construction: Rising from the rear of the frame E is a post 23, to which is bolted a bracket 24. This bracket is located in advance of the saw in a plane directly above that traversed by the plank on its way to the saw. Pivoted to the horizontally-disposed body of the bracket are two vertically-arranged rearwardly-extending wings 25, which lie on the respective sides of the central line of the machine, so that the plank will pass between them. On the face of the bracket is a vertical extension 26, on which are pivoted at 27 the adjacent ends of two T-shaped levers 28, whose depending arms 29 embrace the wings, respectively, and are provided with set-screws 30, that take against said wings. Resting upon the horizontal arms of the levers 28 is the horizontal member of a vertically-movable T-head 31, the vertical member of the latter having a pin-and-slot connection 32 with the bracket extension 26. To this extension, directly above the head, is pivoted a weighted lever 33, which bears upon the opposed, preferably pointed, end of the vertical member of the head 31. The pressure thus exerted by the head upon the opposed portions of the levers 28 tends to maintain the depending members of the latter vertical. Besides, any lateral movement of one lever will raise the vertical head to permit a corresponding movement of the other lever. Hence as the plank advances between the wings the set-screws will bear uniformly against the opposed faces of the former, and thereby insure the centering of the plank in respect to the saw. The set-screws are adjusted from time to time to meet the requirements of the different thicknesses of the material.

The final feature of my invention consists in means for varying the tension of the belts which drive the lateral cutter-heads G and H. The vertical shafts of these heads are provided with the usual pulleys U V, respectively. At the forward end of the machine is a vertical shaft, upon which are supported two pulleys X X', to the latter one of which power is applied. To the frame A, immediately rearward of the pulleys X and X', are pivoted the arms of a U-shaped housing 34, whereby the latter may be swung horizontally within certain limits. On the other end of this housing is a swivel-nut 35, through which extends a screw 36, fitted to a bracket 37 on the side of frame A. The screw is provided with a handle whereby it may be manipulated to effect the horizontal adjustment of the housing. In the latter is mounted a vertical shaft 38, upon which is fixed a pulley 39, around which and the pulley U passes a belt 40. Passing around the pulley X and the pulley V is another belt 41, against which the belt 40 is forcibly pressed by the pulley 39. Hence when the belt 41 is driven from its pulley X power is transmitted, through the frictional contact of the belts, to the belt 40, and in consequence the lateral cutter-heads are driven in concert. By properly adjusting the housing, as described, the tension and frictional contact of the coacting belts may be increased or diminished, as occasion requires.

I claim as my invention—

1. In a machine of the character described, the combination with the frame having upon its upper portion a longitudinal rib 4, and the beveled surfaces 5, at the ends of said rib, of a jointing-table comprising a narrow bar channeled longitudinally on its under side to engage said rib, and provided with downwardly-projecting end supports 3, having beveled surfaces which rest upon and coact with the correspondingly-beveled surfaces 5, together with an adjusting device connected with said frame and table, substantially as specified.

2. In a machine of the class described, and designed for operating upon narrow or edgewise-disposed material, the combination with a supporting-frame, of a laterally-tilting saw-carrying frame mounted thereon and having its axial bearings in the vertical plane of the saw and its center of movement in a line intersecting the axis of the saw in the horizontal plane thereof, and the saw-arbor mounted on said carrying-frame and free to swing in a vertical plane both above and below its normal or horizontal position, whereby the saw thereon may be inclined in either direction with respect to the line of feed, substantially as specified.

3. In a machine of the character described, the combination with the supporting-frame, of a rocking or tilting saw-carrying frame pivotally and adjustably mounted thereon, and having its bearings in the vertical plane of the saw and its center of movement in a line intersecting the axis of the saw in the horizontal plane thereof, means for adjusting said rocking or tilting frame to tilt or incline the saw in either direction with respect to the line of feed of the machine, and means for effecting an adjustment of said frame in a direction transverse to the line of feed, substantially as specified.

4. In a machine of the character described and designed for operating upon narrow or edgewise-disposed material, the combination with a main supporting-frame, a supplemental frame mounted thereon to move transversely with respect to the line of feed of the machine, and means for adjusting said supplemental frame, of a saw-supporting frame pivotally mounted on supplemental frame to swing in both directions with respect to the line of feed, and having its pivotal bearings in the vertical plane of the saw, and its center of movement in a line at right angles with the axis of the saw and intersecting the same in the horizontal plane of said axis and means for adjusting said saw-supporting frame, so as to tilt or incline the saw with respect to the line of feed of the machine, substantially as specified.

5. In a machine of the character described, the combination, with a main supporting-frame, of a plank-centering device on the latter, comprising two pivoted levers having depending arms arranged oppositely with respect to the feed-line of the machine, a vertically-adjustable head bearing upon said levers, a weighted lever acting upon said head, and adjusting devices on the said arms, substantially as specified.

6. In a machine of the character described, the combination with the main frame, of a plank-centering device on the latter, and comprising two vertically-arranged pivoted wings 25 which lie on the respective sides of the central line of the machine and in advance of the saw or other tool, the two T-shaped levers having depending arms which embrace the respective wings and have an adjustable bearing thereagainst, a vertically-adjustable head acting upon said levers, and a weighted lever acting upon said head, substantially as specified.

7. In a machine of the character described, the combination with a main supporting-frame, of a plank-centering device on the latter, comprising two oppositely-disposed pivoted T-shaped levers, a vertically-adjustable head bearing upon said levers, and a weighted lever acting upon said head, substantially as described.

In testimony whereof I have hereunto affixed my signature this 19th day of August, A. D. 1895.

GEORGE LHOTE.

Witnesses:
ANDREW LOUIS LIOMEYN,
PIERRE MONTAGNETZ.